(12) United States Patent
Hruska

(10) Patent No.: US 7,397,604 B2
(45) Date of Patent: Jul. 8, 2008

(54) NARROW BANDPASS FILTER ASSEMBLIES FOR SOLAR TELESCOPES

(75) Inventor: Curtis Ross Hruska, 895 Colleen Dr., Windsor, CA (US) 95492

(73) Assignee: Curtis Ross Hruska, Windsor, CA (US)

( * ) Notice: Subject to any disclaimer, the term of this patent is extended or adjusted under 35 U.S.C. 154(b) by 272 days.

(21) Appl. No.: 11/415,257

(22) Filed: Apr. 29, 2006

(65) Prior Publication Data

US 2007/0253063 A1 Nov. 1, 2007

(51) Int. Cl.
*G02B 27/28* (2006.01)
(52) U.S. Cl. ................. 359/498; 359/589; 359/260; 359/261
(58) Field of Classification Search ........... None
See application file for complete search history.

(56) References Cited

U.S. PATENT DOCUMENTS

| | | | |
|---|---|---|---|
| 3,938,877 A * | 2/1976 | Strumia et al. | 359/497 |
| 4,092,070 A | 5/1978 | Smithline et al. | |
| 4,204,771 A | 5/1980 | Shull et al. | |
| 4,731,881 A | 3/1988 | Geller | |
| 5,125,743 A | 6/1992 | Rust et al. | |
| 5,287,214 A | 2/1994 | Robertson et al. | |
| 5,291,332 A | 3/1994 | Siebert et al. | |
| 5,574,286 A | 11/1996 | Huston et al. | |
| 5,710,655 A | 1/1998 | Rumbaugh et al. | |
| 5,781,268 A | 7/1998 | Liu et al. | |
| 5,801,831 A | 9/1998 | Sargoytchev | |
| 5,882,774 A | 3/1999 | Jonza et al. | |
| 6,075,597 A | 6/2000 | Olshausen | |
| 6,181,726 B1 | 1/2001 | Lunt | |
| 6,215,802 B1 | 4/2001 | Lunt | |
| 6,269,202 B1 | 7/2001 | Lee et al. | |
| 6,452,646 B1 | 9/2002 | Sharp et al. | |
| 6,452,725 B1 | 9/2002 | Sterling et al. | |
| 6,459,533 B1 | 10/2002 | Clapp et al. | |
| 6,543,153 B1 | 4/2003 | Weber et al. | |
| 6,610,356 B2 | 8/2003 | Kausch et al. | |
| 6,635,337 B2 | 10/2003 | Jonza et al. | |
| 6,700,706 B2 | 3/2004 | Chang et al. | |
| 2005/0078906 A1 | 4/2005 | Lunt et al. | |
| 2005/0207014 A1 | 9/2005 | Sidorin et al. | |

OTHER PUBLICATIONS

Rainer Beck, Solar Astronomy Handbook, 1995 (First published in German, 1982), pp. 57-61; pp. 318-320, Willmann-Bell, Inc., Richmond, VA.

(Continued)

*Primary Examiner*—Stephone B. Allen
*Assistant Examiner*—Lee Fineman
(74) *Attorney, Agent, or Firm*—Nancy L. S. Yamasaki

(57) ABSTRACT

The invention relates to the combination of lower transmittance etalons with higher transmittance filters, including use of a single circular polarizer with high efficiency and optical performance for its filtered polarization, to achieve necessary throughput of a narrow bandpass region. The lower transmittance etalons can be achieved by using lower transmittance solid-state etalon materials, or by control of the coatings on the etalon. Alternate configurations are described that reduce the optical assembly's footprint, and/or include additional filters to remove stray light. An innovative option to heat the etalon directly is disclosed to actively stabilize and maintain the etalon's bandpass.

20 Claims, 2 Drawing Sheets

OTHER PUBLICATIONS

J. A. Dobrowolski, Coatings and Filters, chapter in Handbook of Optics, Walter Driscoll, editor, 1978, p. 8-81; pp. 8-84 to 8-85,McGraw-Hill Book Company, New York, NY.

Donald G. Carson, L. Dean Canfield, and Marshall L. Ogne, Final Report: An Evaluation of Interference Fitlers for Hydrogen-alpha Telescopes for the Apollo Telescope Mount, LMSC-680238, Nov. 1967, pp. 66-70, 73-76, Lockheed Missiles & Space Company.

Edwin Hirsch, Photographing the Sun in H-Alpha, Astronomy magazine, Jan. 1978, pp. 37-39, AstroMedia Corp.

* cited by examiner

NARROW BANDPASS FILTER ASSEMBLIES FOR SOLAR TELESCOPES

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

REFERENCE TO A SEQUENCE LISTING

Not Applicable.

BACKGROUND OF THE INVENTION

Interest in telescopes continues to increase as both professional and amateur astronomers make new discoveries. Optical filter assemblies for telescopes have demanding requirements for stability as well as optical quality, due to the fact that long viewing times are often employed to observe quiescent solar features. This places additional demands on the safety, stability and physical construction of the filter assemblies.

Solar telescopes have the additional requirement that discrete, weak signals must be discriminated against an extremely bright background. First, this is needed to protect the eyes of the viewer, or to avoid saturation and overload of a detector. Second, many events of interest, such as solar flares or filaments, are transient, and would be lost against the bright background signal of the solar luminance without additional filtering. Third, filters that selectively block the high background signal are desired so the observer may discern more details in discrete or transient events.

Narrow bandpass filters and spectrophotometric techniques can be used to block some of the background signal, and aid discrimination of discrete events. Spectrophotometric techniques are particularly suitable for instrumental detection systems, and narrow bandpass filters are more practical for direct telescope viewing. A narrow bandpass filter is precisely designed to control (either block or transmit) light in an extremely narrow wavelength region. For instance, for solar event observation, a wavelength region of particular interest is the Hα atomic line emission centered at 656.28 nm. Hydrogen accounts for more than 91% of the composition of the sun, and this emission line is quite prevalent. Because this atomic emission line is in the visible spectrum, it is readily accessible to human observation—if the bright and extensive background spectrum ranging from the deep ultraviolet (UV) through the far infrared (IR) region can be blocked. Hence, combinations of filters are typically employed to remove exposure to excess light from outside the region of interest, and selectively pass light from the chosen band to the eye.

Narrow bandpass filters are often made by thin film technologies that combine multilayer stacks of coatings to create constructive or destructive interference with the light impinging on the filter. Spacer layers are employed to further narrow the bandpass, but deposited spacer layers can become increasingly lossy, and affect the overall performance of the filter. Therefore, another approach is to form an etalon, in which a physical spacer layer is interposed between reflectors or interference stacks. Etalons fall broadly into two categories: air-gapped, or solid-state.

Air-gapped etalons have been widely used for decades in research telescopes as well as other optical applications. Two plates coated with selective reflectors or other coatings are held at a controllable distance from each other. In principle, this distance can be adjusted to tune the etalon onto the precise narrow spectral band of interest—at least within a narrow tuning window. In practice, the difficulty is to maintain this desired distance, and therefore the spectral position of the narrow bandpass filter, in the face of barometric pressure changes, temperature changes, or even typical transport or alignment changes as one tracks across the sky. If the spacing changes even slightly, the interference design can be detuned to the extent that the narrow band of interest is now blocked from observation. In addition, the coated plates are typically extremely thin optical materials and therefore fragile. Hence, active control of temperature or pressure is typically combined with this technology, by placing the assembly in a heated case, or by more involved pressure control methods such as those described in U.S. Pat. Nos. 4,204,771 and 6,269,202, incorporated by reference. Other methods of tuning and stabilizing the etalon, such as those described in U.S. Pat. Nos. 5,710,655 and 6,452,725, which are incorporated by reference as if fully set forth herein, add specific, additional layers to the etalon that will alter the etalon's composite refractive index and therefore bandpass location in response to variable voltage or thermal changes. Such control systems add complexity, bulk and cost, and may have slow response times to changing conditions.

Solid-state etalons use an extremely high quality crystalline material or optical flat as the "spacer". Thus, the solid-state etalon has a more robust foundation than a variable air gap design. The required etalon coatings are then formed on the outside surfaces of the solid spacer material. This means the spectral range of the narrow bandpass will be more stable to pressure and temperature changes, because it is physically held in position by the solid spacer. However, one can easily understand that significant expense, skill and time may be required to create a spacer of sufficient flatness, transmission and purity to support the reflector layers. In addition, if the manufactured bandpass is even fractionally off-alignment from the wavelength of interest, the etalon must be physically tilted to change the effective pathlength through the filter, and this may alter its aperture or aspect ratio in an optical assembly. Nonetheless, such tilt control can be implemented easily and reproducibly, and actually may be used advantageously to redirect stray reflections out of the optical path.

In any optical assembly, there will be concern with overall light throughput. Often solid-state etalons suffer from absorption losses due to impurities or irregularities in the crystal structure, or to their inherent optical properties. Hence, one commonly chooses materials with the highest transmittance, so that subsequent optical losses throughout the system can be better accommodated. For instance, while mica cleaves cleanly along parallel crystal plates, it is difficult to control reproducibly, and may contain inclusions. Moreover, mica has lower transmissivity than silica, lithium niobate, or other crystals, especially the less expensive and more common varieties of mica. This has lead to the continued development of carefully controlled synthesized crystals rather than the use of natural materials. Unfortunately, such synthesis is typically accompanied by higher costs. Nonetheless, with the increased emphasis on high transmissivity starting materials to counteract other system losses, this extra cost is commonly perceived as a necessity for the required optical performance, and the lower transmissivity mica materials typically have been avoided as unsuitable for high precision use.

While the etalon defines the narrow bandpass of interest, for practical applications, one combines the etalon with other filters to further enhance rejection of stray, excess and extraneous light. This is particularly important in sensitive detection systems because etalons tend to transmit light from multiple reflections within the spacer of the etalon, giving rise to closely spaced "orders" of passbands. Hence, combinations of etalons with various, broader band blocking filters or rejection filters have been reported since at least the 1960s, and used in telescopes, including the Hα telescope designed for the Skylab mission, remote sensing systems, and spectral analysis.

Exemplary systems often include rejection filter(s) to block light well away from the spectral region of interest (UV and/or IR filters, for instance) and furthermore, use additional visible light filters to remove or block higher order overtone transmissions.

For instance, U.S. Pat. No. 4,092,070, which is incorporated by reference as if fully set forth herein, uses a tunable acousto-optic filter in combination with an etalon to actively select bandpasses. U.S. Pat. No. 5,125,743, which is incorporated by reference as if fully set forth herein, describes a sophisticated system for measuring solar magnetic fields by actively tuning an etalon between different bandpasses. In this complex system, a first bandpass is chosen to infer the solar magnetic field from a given atomic emission, while a second bandpass is selected to provide data on the direction and intensity of the field in order to combine information and construct the solar magnetic vector maps. The system further employs multiple additional filters, including a narrow bandpass filter to selectively block other wavelengths away from the atomic emission, and requires rotatable or variable polarization analysers to characterize multiple polarization states of transmitted light for additional magnetic field information. This illustrates another innovative approach to the use of etalons, and their versatility in combination with other optical elements to create highly sensitive and selective detection systems.

In addition, optical systems using etalons to define narrow bandpasses of light may incorporate additional filters and techniques, such as those described in U.S. Pat. Nos. 5,287,214 and 5,781,268, which are incorporated by reference, and which are specifically designed to recombine polarization states separated by the etalon. These techniques are designed to make the systems insensitive to polarization effects and increase total light throughput by additively combining different polarization states. Such techniques as described require filters or techniques that can provide at least two changes in polarization state, so that any one state may be transformed into its complementary state and continue along the optical path.

While solar telescopes require sufficient light throughput for observation, they have the additional requirement of maximum rejection of stray light caused by reflections off the filters, and excess, extraneous light. Too much filtering may isolate the exact bandpass desired, but not with enough intensity for viewing. Too little filtering and the signal is lost in the high background noise of the solar spectrum. Furthermore, the viewer or detector can be irreparably harmed by excess radiation. Thus, such telescopes have unique and demanding requirements for careful filtering.

Recent telecommunications advances have lead to further improvements in narrow bandpass technologies. Multiplexed communication channels have similar requirements for high stray light rejection plus optimal and highly selective throughput of extremely narrow bandpasses. These techniques and capabilities may enhance performance in non-related fields such as solar telescopes.

Accordingly, improved optical filter assemblies for solar telescopes that couple advances in filter design and capabilities with cost-effective construction are desired.

SUMMARY OF THE INVENTION

The preferred embodiments of the invention relate to the combination of lower transmittance etalons with higher transmittance filters, including a single circular polarizer with high efficiency for its filtered polarization, to achieve necessary throughput of a narrow bandpass region. Preferably, the etalon has transmittance of less than 25%, and a bandwidth of less than 0.15 nm. The lower transmittance etalons can be achieved by using lower transmittance solid-state etalon materials, or by control of multiple coatings on the etalon. The circular polarizer is produced by combining a quarter-wave plate with a linear polarizing element that has a contrast ratio of at least 500:1 and an optical performance of at least 85% for its filtered plane of polarization along the optical path of the filter assembly. In preferred embodiments, the linear polarizing element is an absorptive-type or reflective-type linear polarizer. In other preferred embodiments, the linear polarizing element of the circular polarizer may be a reflective/transmissive-type polarizer, such as polarizing beamsplitters or wire-grid polarizers. The quarter-wave plate of the circular polarizer may be optionally achromatic. These alternate embodiments describe filter combinations that reduce the optical assembly's footprint, and provide additional methods to remove stray light.

In preferred embodiments, a blocker/trimmer filter is used to further control and reduce light outside of the wavelength region of interest. Preferably, the blocker/trimmer has a transmittance of at least 40% and a bandwidth of less than 5 nm.

In yet another preferred embodiment, a pre-filter is added to further limit excess light. This pre-filter may reduce light away from the region of interest in one or more sections of the energy spectrum. In yet another preferred embodiment, AR (antireflective) filters are included to reduce stray reflections off optical surfaces.

In a further embodiment, direct heating of the etalon is employed to actively stabilize and maintain the etalon's bandpass. Direct heating may be accomplished by physically contacting the etalon to a thermally conductive, electrically powered optical element, such as indium tin oxide-coated glass.

In another embodiment, two viewing areas at angles to each other may be created from a single incoming beam by using a circular polarizer comprised of a reflective/transmissive-type linear polarizer.

Other features and advantages of the present invention should become apparent from the following description of the preferred embodiments, taken in conjunction with the accompanying drawings, which illustrates, by way of example, the principles of the invention.

DESCRIPTION OF THE DRAWINGS

The various objects, features, and advantages of the present inventions may be better understood by examining the Detailed Description of the Preferred Embodiments found below, together with the appended figures, wherein.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

For convenience, the invention will be described as used for Hα solar observation. It will be clear to those of ordinary skill in the art that similar elements and techniques of the invention would apply for other visible wavelength selections, such as Hβ, calcium K-line, or other atomic or molecular species of interest, with the straightforward adjustment of bandpass regions to accommodate viewing of these alternate lines.

One aspect of the present invention is significant emphasis on stray light reduction. This is particularly important for solar viewing because of the extremely high background signal (full sunlight exposure) vs. the extremely narrow atomic emission band of interest. Recall that typical glass surfaces reflect about 4-6% of the incoming light. If this stray reflection is not contained or eliminated, it can easily propagate through the optical system via multiple bounces and reflections from the optics. This can easily blur the image from the true light path due to off-axis contributions of stronger stray light. Alternately, the precise signal from the emission band will be obscured if too much additional light processes through the optical system. While one extremely narrow bandpass filter is theoretically sufficient to select the emission band of interest, such filters are not perfect out-of-band blockers in reality. Therefore, a careful combination of additional filter elements is used to remove additional stray and excess light either sequentially or cooperatively.

Figure 1:
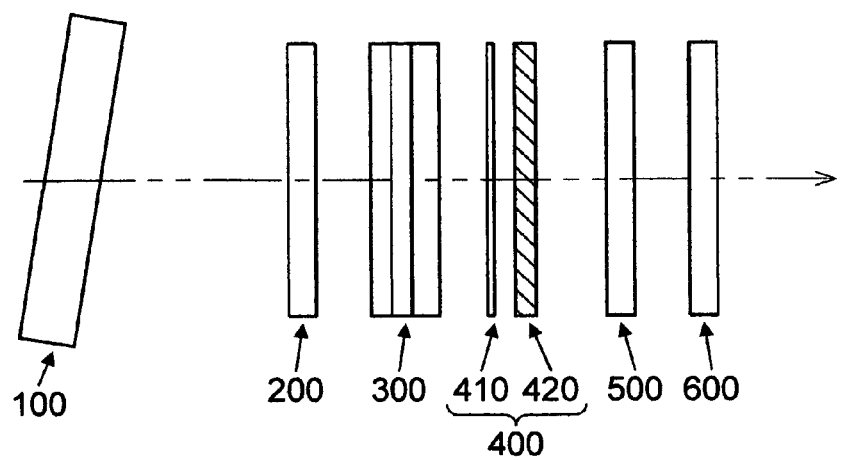
FIG. 1 shows an exemplary schematic of filter elements according to one preferred embodiment of the invention.

FIG. 1 shows a schematic view of filter elements for one embodiment of the invention. A pre-filter 100 blocks light away from the region of interest. This reduces excess light flux that may cause extraneous heating of the telescope and filter assembly optics, or absorption within the materials, and degrade their optical performance. Preferably, the pre-filter is designed to reject either UV or IR light. More preferably, the pre-filter is designed to reject both UV and IR light. This may be accomplished using a single filter element with multiple coatings, or a series of filter elements mounted sequentially.

The pre-filter substrate may be an optical material with high transmittance throughout the visible region, or an optical material that absorbs or rejects light in specific wavelength regions, such as colored glass filters. For example, for Hα viewing near 656 nm, one can use materials such as quartz, BK-7 glass or fused silica as high transmittance substrates, or colored glass with bands that block or absorb wide regions of the UV, IR or even portions of the visible wavelength regions. For instance, glass substrates with wideband absorptions and controlled transmission regions may be sufficient pre-filters without additional coatings for some applications. Exemplary pre-filter substrates of this variety are Schott glasses RG610 and OG590, which achieve 50% of their peak transmission at 610 nm and 590 nm, respectively, and then have increased transmittance through the rest of the visible region. The absorptance of these glass filters preferentially blocks light of wavelengths shorter than the ranges specified, but continue with high transmittance into the IR region.

Further refinement of the pre-filter rejection and pass bands may be provided by adding selective coatings to the pre-filter substrate. Such selective coatings may provide additional rejection in the UV or IR region, or further narrow the transmission band in the visible region. Preferably, antireflective (AR) coatings are added on one or both sides of the filter, whether other selective filters are added or not, for additional reduction of stray reflections. The AR coatings can be broadband, or narrowband filters in the region of interest. For instance, one preferable AR design for Hα observation is a "V" coat centered at 656 nm with a minimum reflectance of less than 0.1% at the design wavelength, and increasing to only about 0.2% reflectance near 596 nm and 729 nm.

Other exemplary coatings for the pre-filter may include IR reflectors or heat mirrors, dichroic filters that pass red light centered near 656.5 nm but reflect other visible light, and UV reflectors. IR and near infrared light reflection is particularly desirable to prevent variable, extraneous heating of the subsequent etalon and other filtering optics. UV reflection is useful to reduce intense high energy light that can degrade the optical performance of the telescope optics, substrates or filtering materials.

Exemplary combinations of coatings for the pre-filter include sequences such as the following, starting with the side exposed to incoming light:

"V coat" AR coating/RG610/"V coat" AR coating
"V coat" AR coating/RG610/heat reflector
AR coating/OG590/AR coating
Red transmitting dichroic filter/RG610/IR reflecting dichroic filter
AR coating/red transmitting dichroic filter/BK7/heat reflector/AR coating.

Combinations with AR coatings are particularly useful to reduce stray light reflections within the optical path. In addition, preferably the pre-filter is tilted a few degrees from the axis of the light path to further re-direct reflections out of the viewing path. Preferably, the pre-filter will be angled about 2-15° from the optical axis.

Element 200 in FIG. 1 is an AR filter, such as a V coat centered at 656 nm, deposited on an optical material with high transmission in the visible region. This element provides additional removal of stray reflections and excess light beyond the region of interest near 656 nm. A high transmittance substrate is preferred for element 200 to avoid limiting total light throughput too drastically at this early stage in the optical assembly. A substrate with low absorptance is further preferred to avoid unwanted and extraneous heat load from the exposure to high solar flux at this point in the optical assembly. Examples of suitable high throughput substrates include quartz, fused silica and BK7 glass.

Element 300 in FIG. 1 is a "blocker/trinmer filter", an important element to remove light away from the wavelength region of interest. Preferably, the blocker filter portion will have a FWHM (full width-half maximum, defined as the full spectral bandwidth that provides 50% or more of the maximum filter performance) of less than 5 nm. More preferably, the FWHM of the blocker filter will be less than or equal to 2 nm, and even more preferably, less than or equal to 1.5 nm. The trimmer filter, preferably, will have a FWHM of 20 nm or less, and more preferably a FWHM of 15 nm or less. Hence, the FWHM of the narrower blocker filter will dictate the overall FWHM of the combined filter. One preferred embodiment of 300 is an interference filter made with dielectric materials combined with an induced transmission dielectric/metal filter. For Hα viewing, these filters will be centered near 656 nm, and the combined blocker/trimmer filter will have a FWHM of less than 5 nm. Blocker/trimmer filters typically will have a combined transmittance of about 40-50% at the design wavelength. In addition, the combined blocker/trimmer preferably has out of band rejection of at least an optical density of 5.

The blocker and trimmer filters may be created separately on two thin optical substrates. However, additional surfaces allow additional extraneous reflections. Therefore, a combination filter is preferred for element 300 to reduce standard reflective losses from multiple surfaces, and to reduce stray polarized light reflections. In addition, a combination filter may reduce the overall physical thickness or space required by the parts, advantageously decreasing the overall footprint of the assembly.

One exemplary method to produce a combination filter is to deposit the blocker/trimmer filters on opposite sides of the same substrate. However, if an error occurs while coating the second side, the whole filter is unusable. Therefore, in another preferred embodiment of the present invention, the blocker and trimmer filters are deposited on two separate substrates that are carefully laminated to each other with optical-quality adhesive to form the combination blocker/trimmer filter. The lamination with an optical adhesive eliminates at least two reflective surfaces. Furthermore, for additional rejection and light control, this blocker/trimmer combination can be laminated to a broadband filter, such as RG610 glass. An exemplary laminate with this type of construction for element 300 creates a combination blocker/trimmer unit with a FWHM of about 1.5 nm, an average optical density of >5, and out-of band rejection of light from the x-ray region through the far IR.

Element 400 is a circular polarizer to provide further removal of stray light and selection of the wavelength of interest. A circular polarizer is preferred over just a linear polarizer for more precise control of the light throughput and more extensive rejection of stray light scattered off the other optical elements. Uniquely, the inventor found that a single circular polarizer was sufficient and effective for this additional control. The use of only one circular polarizer rather than multiple circular polarizers is desirable for both cost and space considerations. The effectiveness of a single circular polarizer resides in the inventor's particular combination of filters for the optical assembly, and the optical characteristics of these elements.

One common method to produce circular polarizers is to combine $\lambda/4$ (quarter-wave) plate and a linear polarizing element. This combination will be described in more detail to illustrate the invention's practical embodiments.

The quarter-wave plate portion of circular polarizer 400 is identified as element 410. A $\lambda/4$ plate 410 can be produced, for example, from interference thin films, plastic films with optical retarding behavior (such as oriented birefringent materials), or by cleaving quartz, mica or other optical materials to appropriate thicknesses to achieve $\lambda/4$ interference with the light path. For Hα viewing, such a $\lambda/4$ plate will be centered at about 164 nm. Preferably, the $\lambda/4$ plate is positioned toward the entrance of the optical path rather than behind the linear polarizer. This configuration more effectively eliminates back-reflections off the other elements in the optical assembly, due to rotations of the back-reflected light. Thus, the reflections will interfere less with the originally selected plane of polarized light (the light that passes first through these controlling optical elements) and less noise will propagate through the optical assembly. In another preferred embodiment, the $\lambda/4$ plate is achromatic for more selective filtering, and more versatility of use if another wavelength of interest is selected.

The linear polarizing element 420 to be used in the circular polarizer 400 is shown in FIG. 1 operating in a transmissive mode; that is, the linear polarizer interacts with the incoming light such that the transmitted beam contains preferentially one plane of polarization. This operation can be accomplished by various techniques, and the linear polarizing element can be produced of various materials, as known to one of skill in the art. The simplest construction for the linear polarizing element is a sheet linear polarizer, including multilayer or composite constructions. Examples of suitable linear polarizers for use in element 400 of FIG. 1 include both absorptive-type and reflective/transmissive-types. In addition, either broadband linear polarizing elements, which polarize light over an extended region of the wavelength spectrum, or narrowband linear polarizing elements that preferentially control near the wavelength region of interest may be used.

In absorptive-type designs, molecules are aligned to absorb light preferentially in one of the planes of polarization. Since one plane of polarization is thus removed by absorption, the other plane of polarization is preferentially transmitted through these absorptive-type linear polarizers. Absorptive-type polarizers can be produced, for example, by aligning nanoparticles or dichroic molecules such as iodine, liquid crystals, or certain known dyes on or within substrates. Exemplary substrates include glass and linearly stretched organic films, such as polyvinyl alcohol, cellulose triacetate, or cellulose butyl acetate. In addition, absorptive-type polarizers may be made by multilayer designs, described for example in U.S. Pat. Nos. 6,610,356 B2 and 6,452,646 B1, which are incorporated by reference as if fully set forth herein.

Other types of linear polarizers may also be used for the linear polarizing element 420 of circular polarizer 400 in FIG. 1, such as reflective/transmissive-type linear polarizers. These are linear polarizing elements that preferentially reflect one plane of polarization, and transmit the other plane of polarization. These can again be sheet linear polarizers, often with multilayer construction, or other optical substrates with reflective or partially reflective optical coatings. Polarizing beamsplitters are another exemplary reflective/transmissive-type linear polarizer. They are often constructed in a cubic or prismatic shape with optical coatings on the surfaces to direct one plane of polarization by reflectance, and transmit the other plane of polarization. Another exemplary reflective/transmissive-type linear polarizer is a wire-grid polarizer. Wire-grid polarizers have relatively high transmittance in the p-state, and very high reflectance of the s-state of polarization. A wire-grid polarizer would preferably be used in the transmissive mode as shown in the schematic of FIG. 1 because a small amount (up to about 3%) of the p-state of polarization is also reflected along with the s-state polarized light. This additional p-state reflectance would appear as undesirable noise along the optical path if the wire-grid polarizer were used in reflection mode. Note that when wire-grid polarizers are used, they are commonly positioned at an angle to re-direct the high surface reflections out of the optical path. Reflective/transmissive-type polarizers may be augmented with absorbing media positioned outside the primary optical path to act as "beam-blockers" that intercept their reflected beams and remove them from the system.

For any of the various constructions used for the linear polarizing element 420 of the circular polarizer 400, linear polarizers with excellent optical performance and high contrast ratio are preferred. Preferably, the linear polarizing elements for the circular polarizer 400 have an optical performance of greater than ~85% for at least one plane of polarization; that is, they direct at least about 85% of one plane of polarization along the optical path of the assembly. The optical assembly of FIG. 1 shows a transmissive path through the optical elements. Therefore, according to the present invention, the linear polarizing elements' optical performance in transmission is greater than 85% for use in this assembly configuration. Furthermore, the linear polarizing elements preferably have a contrast ratio (polarization extinction ratio) of at least 500:1 at the wavelength of interest, which means they are extremely efficient at blocking the other plane of polarization along the light path. More preferably, the contrast ratio is ≧1000:1 at the wavelength of interest, and even more preferably ≧5000:1.

The preferred circular polarizer of element 400 makes use of advances in linear polarizer design to meet the challenging requirements for contrast and resolution in the telecommunications and high performance display industries. Coupled with λ/4 plate 410, this creates a circular polarizer that typically directs more than 85%, and preferably closer to 90% or more of the selected polarization of light along the optical path, (i.e., has an optical performance of 85%, and preferably closer to 90% or more) as compared to about 70-75% for more common broadband visible circular polarizers.

Circular polarizer element 400 may be two discrete pieces as shown (a λ/4 plate 410 and a linear polarizing element 420), sourced separately and assembled for the present invention, or it may be a commercially available circular polarizer, such as a high performance, achromatic circular polarizer from Boulder Vision Optik (Boulder, Colo.), with transmittance of about 88% at 656 nm, and a contrast ratio of 6250:1. If element 400 is assembled from separate pieces, it is preferable to AR coat the exposed surfaces to reduce further stray reflections and/or physically couple the pieces to reduce the number of reflective surfaces. Such physical coupling can be achieved by lamination, bonding, contacting, and other methods known to those of ordinary skill in the art.

Element 500 of FIG. 1 is the solid-state etalon that provides the narrowest spectral filtering of the optical system. Preferably, the etalon is designed to have a bandwidth, for Hα viewing centered at 656.28 nm, of about 0.02-0.14 nm. More preferably, the etalon is designed to have a broader or narrower bandwidth within this narrow range to meet the requirements of the particular application. For example, for more general observation of solar flares, prominences or chromospheric features, an etalon bandwidth of about 0.06-0.12 nm is preferable. For observation of more subtle chromospheric events, such a fibrils, plages and fine structure near solar active regions, an etalon bandwidth of about 0.02 to 0.06 nm is preferred. For general use and versatility, many astronomers prefer a bandpass of about 0.04 nm to about 0.07 nm.

It is obvious that these are extremely demanding requirements. In addition, they must be maintained over the largest possible area of the etalon's aperture, because this is used in an imaging telescope design. It is difficult enough to maintain tight wavelength control when one is transmitting light through fiber optics, but in the present invention, one has the added complication of maintaining bandpass integrity over a larger filter and viewing area. If the etalon bandpass is not uniform over the viewing area, for instance, due to crystal structure impurities, one will either distort or actually block the view of features of interest. This defeats the usefulness of the device.

Hence, very stringent requirements are placed on the etalon for a solar telescope system. It must have extremely high selectivity to block the broad, bright background signal of solar emissions. It must be stable, or capable of quick and reproducible stabilization. It must have high spatial uniformity over the active aperture. In addition, it must have high enough transmittance that it does not compromise the needed throughput for viewing.

The present invention makes use of advances from the telecommunications and display industries to enable previously unacceptable alternatives. The improvements in filter throughput and narrowed bandpasses that have occurred to answer the needs of the telecommunications encouraged the inventor to re-examine alternate etalons. Of particular interest were other solid-state mica etalons.

The most commonly used mica etalon is called pale green mica. When processed for use as an etalon with a bandpass in the 0.1 nm range, it may show transmittance of about 30-80%. This is sufficiently high that it can be used in similar applications to air-gapped etalons, as reviewed in the chapter *Filters and Coatings based on Interference in Thin Films* by J. A. Dobrowolski, *Handbook of Optics* (McGraw-Hill, Inc., New York, N.Y., 1978). In contrast, the inventor found that absorbing mica (such as pale ruby red, pale brown, standard green and straw yellow mica) could be used in his invention due to the higher transmittance of the other elements in his design and his particular combination of elements.

For safe and comfortable human viewing of solar events, the transmittance of the telescope at the wavelength of interest should be in the range of about 5-8%. At lower levels, one will lose contrast, and at higher levels, there may be significant discomfort or danger to the eyes. It is true that if a camera system is employed, lower transmittance may be sufficient; however, for maximum versatility of a telescope, one would prefer to have a system suitable for direct observation, with the option of additional filtering for photographic recording.

A solid spacer etalon of absorbing mica will have a transmittance in the range of about 10% to about 20%. From the prior art on typical circular polarizers, if one combined an etalon with 12% transmittance with a previously-available circular polarizer having 70% T, the total transmittance through just these two elements will be only 8%. Hence, use of such an etalon in the present invention would not be a practical consideration for designers of common skill in the art, who know that stray losses always occur in addition to any designed transmittance reduction due to filter requirements. Moreover, even without stray losses, a designer of common skill would recognize that the combination of these two elements with blocker/trimmer filter defined as element 300 would cut the total transmittance to 4%. This value is already below the desired telescope transmission range, and other filters are still needed for best optical performance. It is the inventor's careful combination of unique elements with high optical performance, including the aforementioned circular polarizer 400, with this lower transmittance etalon that creates a new product with the needed performance attributes.

The inventor noted that while the absorbing mica has significantly lower overall transmission, it might be less expensive and more uniform in its crystal structure than the standard pale green mica. This could be advantageous for better uniformity in viewing regions (optical performance improvement), and in lower production costs (manufacturing improvement). Similarly, the methods to enable effective use of absorbing mica would be applicable to other alternate materials with lower transmittance. Therefore, the inventor worked diligently on the present innovative designs that could enable use of such alternate materials for etalon 500.

Conversely, if the overall transmission of other etalon systems could be reduced to lower transmittance, they also would function well as the etalon element 500 in the inventor's designs. This lower transmittance might be achieved by adding more coating layers, such as metals, absorbing layers, dielectric thin film interference layers and/or multilayer stacks, onto an etalon with higher intrinsic transmission. Preferably, transmittance of the etalon, either with the added coating layers or with an absorbing substrate, will be less than or equal to about 25%. More preferably, the transmittance will be less than or equal to about 20%. By careful but straight-forward control of the optical design created with the additional layers, this approach could have the further benefit of creating etalons with narrower bandwidths, a distinct advantage for viewing fine solar features. Hence, the inventor recognized yet another unique use of his inventive approach to optical assemblies.

Element 600 of FIG. 1 is an additional exit AR filter to reduce stray reflection and out-of-band transmission at the viewing exit of this optical assembly. This acts as a companion to element 200 and together these elements provide controlled filtering at the beginning and the end of the optical assembly. Element 600 is preferably an antireflective coating centered near 656 nm for use with Hα observation. Since this element may be visible to the viewer using the optical assembly, a broadband AR coating is preferred for less reflection back to the observer. High quality optical substrates are chosen for element 600 to maintain highest filtered throughput, or to augment out-of-band blocking. Examples of suitable high throughput substrates include quartz, fused silica and BK7 glass; examples of suitable absorbing substrates include the Schott glasses OG590 or RG610 mentioned previously.

Figure 2:
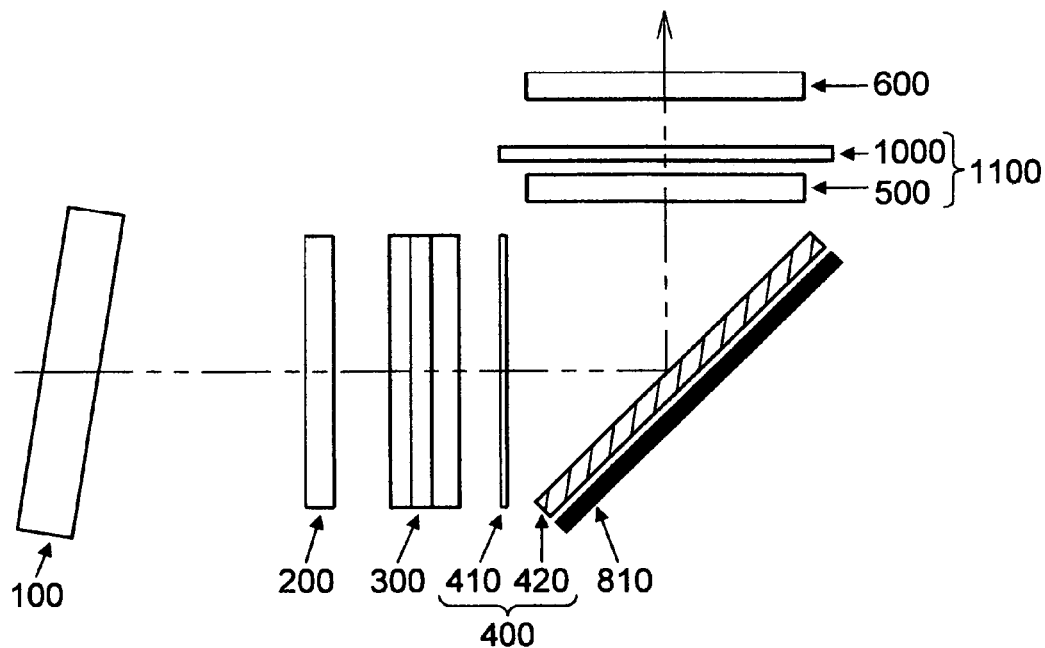
FIG. 2 shows an exemplary schematic of filter elements employing an angled, reflective-type polarizer according to another preferred embodiment.

Another exemplary embodiment of the invention is shown schematically in FIG. 2. This system is designed for more compact construction, and requires reflection or folding of the optical path. The pre-filter 100, AR filter 200, blocker/trimmer filter 300, and exit AR filter 600 function as described previously to reduce stray reflections and transmission of light beyond the wavelength of interest.

In this embodiment, a reflective-type or reflective/transmissive-type linear polarizer is used for linear polarizing element 420 and in combination with quarter-wave plate 410 comprises circular polarizer element 400 in a folded format. Various reflective-type linear polarizers are known from the art. For instance, recent developments in reflective multilayer linear polarizers may be used. Exemplary methods to produce reflective multilayer linear polarizers are described in the literature, for example, in U.S. Pat. Nos. 5,882,774; 6,543, 153 B1; and 6,635,337 B2, which are incorporated by reference as if fully set forth herein. Alternately, reflective/transmissive-type polarizers, such as polarizing beamsplitters, can be used to intercept the incoming light path at an angle to redirect the optical path. In this arrangement, the polarizing beamsplitter's coatings are designed to efficiently reflect one plane of polarization, and transmit the other plane of polarization straight through—and out—of the re-directed optical path.

As with the previous description of absorptive-type and reflective/transmissive-type linear polarizers, preferably, the reflective-type linear polarizing elements used in the present invention will have an optical performance of greater than 85% for at least one plane of polarization; that is, they direct at least about 85% of one plane of polarization along the optical path of the assembly. In FIG. 2, the linear polarizer 420, whether it is a reflective-type or reflective/transmissive-type linear polarizer, creates a reflective path. Therefore, according to the present invention, the linear polarizing elements' optical performance in reflection is greater than 85% for use in this assembly configuration. Again, the reflective-type or reflective/transmissive-type linear polarizing elements preferably have a contrast ratio (polarization extinction ratio) of at least 500:1, which means they are extremely efficient at blocking the other plane of polarization along the light path.

For illustration of this alternate optical assembly configuration, a reflective-type linear polarizing element is shown as an angle mounted surface. If a polarizing beamsplitter with high optical performance in the reflectance mode were used instead, element 420 could have a cubic shape, with the reflective surface along the inner diagonal. Other shapes may also be used.

The folded arrangement is illustrated in FIG. 2 as a 90° redirection of the main light path into solid-state etalon 500. Alternately, the linear polarizing element may be designed and used to reflect polarized light at angles other than 90°. A smaller reflected angle may be preferred, for example, for more compact construction. Similarly, a larger angle might be preferred to reduce back-reflection propagation along the light path.

One challenge for designs with reflective-type linear polarizing elements is the successful removal of the other plane of polarization. Any surface that it strikes may re-direct some of the separated light back into the optical path, either by direct reversal or via multiple reflections. This may contribute a significant amount of background noise because this back reflected plane of polarization will be transmitted by the linear polarizing element. Hence, this scattered light can easily propagate as noise along the light path. Moreover, in multiple reflections, it is even possible that the plane of polarization is reversed, such that light of a polarization that would have been rejected originally now appears as if it were true signal. The problem with this added signal is that it will not contain the same information because of its inherently different light path. Thus, its signal will blur the actual true information of the originally selected polarization.

To address this challenge, methods to physically block or absorb light that penetrates the reflective-type linear polarizer are typically employed, so stray light cannot re-enter the optical path. This may be accomplished, for example, by covering the surfaces of a polarizing beamsplitter's cube that do not contain the main light path, or placing absorbing media just beyond the surface(s) of a reflective-type polarizer. Common examples of absorbing or blocking media include absorbing black paint, absorbing coatings, absorbing black glass, absorbing glass with added back surface AR coatings, and the like. This is illustrated by element 810 in FIG. 2. One of ordinary skill in the art will recognize that if the polarizing element 420 were differently shaped, then multiple absorbing elements could be needed. For instance, if element 420 were a cubic beamsplitter, two absorbing coatings might be used to intercept light on two perpendicular sides of the cube beyond the diagonal. Absorbing element 810 may be free-standing as shown, or may be directly coupled to the surfaces of the linear polarizing element 420. While direct coupling of the absorbing media is preferred to avoid adding more surfaces for reflection, it may not be practical for a variety of factors, such as fragile surfaces; cost of direct coating versus purchase of separate absorbers, or material incompatibilities. When direct coupling is used, it may be accomplished by means such as optical adhesives, wet chemical coating, solvent bonding, vacuum coating and other methods known in the art.

A separate λ/4 plate 410 is used as shown in the optical path of FIG. 2 to create, with linear polarizer 420, the inventions' circular polarizer 400 with high optical performance. Element 410 may be an achromatic λ/4 plate, or may be a non-achromatic λ/4 plate, such as those made, for example, of biaxial crystal or polymer retarder film. Particularly in the configuration of FIG. 2, element 410 has a dual purpose: in addition to producing circular polarization in the incoming light beam, it serves an important role, like the absorbing element 810, in controlling and removing stray reflected light. The first surface of solid-state etalon 500 can easily reflect light back toward the reflective-type linear polarizer 420. Since these polarizers are non-absorptive, this back-reflection can propagate more easily through the system and create a significant amount of stray light. When light is back-reflected off etalon 500 and strikes the λ/4 plate, it is rotated into the opposite plane of polarization. This rotated light will now pass directly through element 420 and be absorbed by absorbing element 810.

Optionally, another high transmittance linear polarizer of the absorptive-type [not shown] may be added to the assembly described in FIG. 2 either directly before or after the etalon 500. This will provide still further rejection of non-selected polarized light, and additional blocking of stray reflections, if included as an option.

For an exemplary assembly such as FIG. 2, polarizing beamsplitters typically have in-plane reflectance in the range of about 89-97% (i.e., an optical performance in the range of about 89-97%). Thus, the total optical throughput of the circular polarizer 400 created by combination of such a high performance linear polarizers with λ/4 plate 410 will still be in the range of 85% or better. If such a circular polarizer, with 90% T, were combined with an air-gapped etalon or high transmittance solid-state etalon of 40% T, the overall transmittance would be 36%, a value that far exceeds the safe range for viewing. Even adding a blocker/trimmer filter 300 with 50% T only brings the transmittance down to 18%. Hence, this would not have been a logical combination of elements for solar observation systems. In contrast, a solid-state etalon 500 with a value of 12% T combined with a circular polarizer 400 of 90% T and element 300 gives a total transmittance value of 5.4%, comfortably within the range preferred for human viewing of solar events.

Figure 3:
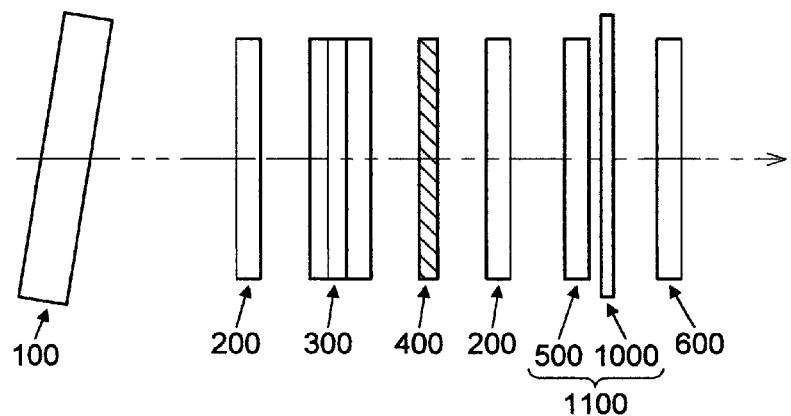
FIG. 3 shows an exemplary schematic of filter elements employing a heated etalon construct according to another preferred embodiment.

FIG. 3 shows another innovative embodiment of the invention. As discussed earlier, the extremely narrow bandpass of the etalon will be susceptible to environmental factors such as pressure, humidity and temperature that may alter the bandpass' wavelength position and width. Therefore, designers often employ physical control mechanisms to regulate and stabilize the etalon bandpass, particularly with air-gapped etalons. For solid-state etalons, it is common to place the etalon alone, or the etalon plus at least a portion of the optical assembly of filters used with the etalon, in a controllably heated enclosure. While practical, such heated enclosures may be bulky, and may require an inconvenient amount of time to stabilize before operation.

Thin film optical design developments suggested an alternate approach. Transparent conductive layers, such as indium tin oxide (ITO)—coated glass, have been used recently to provide electrically conductive layers in optical designs. This has been used to power and control electrochromic activity, as well as to tune absorptive properties of layers, such as liquid crystals, which may change their orientation in response to electric fields. Similarly, U.S. Pat. No. 5,125,743, which is incorporated by reference as if fully set forth herein, mentions using electrically conductive layers on an etalon to alter the refractive index and therefore change the bandpass of the etalon.

The inventor recognized another property of these electrically conductive layers: they tend to be thermally conductive. This is often a problem in multilayer stacks and sensitive optical systems because heat may physically alter and degrade materials. However, in the present invention it may be used to advantage to gently heat contacted elements.

FIG. 3 illustrates this possibility. This embodiment uses the pre-filter 100, blocker/trimmer filter 300, and exit AR filter 600 as shown previously. Two AR filters (200) are used for further reduction of stray reflections. The second of these AR filters is an optional element, which may be added for slightly increased transmittance of the optical assembly, or for further refined control of reflections. For illustration of alternate preferred embodiments, the circular polarizer 400 is here shown as a composite circular polarizer with high performance in transmission.

In this embodiment, the solid-state etalon 500 is coupled to a thermally conductive optical element 1000 that is powered electrically. This creates a heated etalon construct 1100. The substrate for the thermally conductive optical element 1000 is preferably a high transmissivity optical material, such as glass, quartz or fused silica. A material or a combination of layers of different materials are deposited on the substrate to create an element that can be powered to alter its thermal properties in a reproducible manner. One preferred example of this element is an ITO layer of uniform density and thickness deposited onto a glass substrate. Preferably, the ITO-coated substrate will be slightly larger in area than the etalon. Electrical leads can then be connected to the conductive surface beyond the area that will be coupled to the solid-state etalon. The etalon is coupled to the thermally conductive layer by physically contacting the two elements. This can be accomplished by techniques such as lamination, solvent bonding, adhesive bonding, liquid coupling agents, joining via deposited interlayers, optical contacting, pressure contact, and the like. As described above, element 500 may be a solid-state etalon comprised of absorbing material or an etalon material with multiple coatings to reduce transmittance and preferably, narrow the bandwidth of the etalon.

In another preferred embodiment of this heated construct, the back surface of element 1000 (i.e., the surface that is not coupled to solid-state etalon 500) is AR coated to further reduce stray reflections.

Preferably, the heated etalon construct 1100 is separated slightly or more preferably, isolated from the other elements in the optical assembly. This concentrates the controlled heating at the etalon 500 where it is needed, and reduces incidental heating of the other elements that could degrade their optical or physical properties. Spacers are one common way to effect such separation, and the materials of their construction may be selected to provide thermal and/or electrical insulation too.

Alternately, one can readily understand that the heated etalon assembly 1100 could be substituted for element 500 in FIG. 2, to create a compact optical footprint with a stabilized etalon filter.

Figure 4:
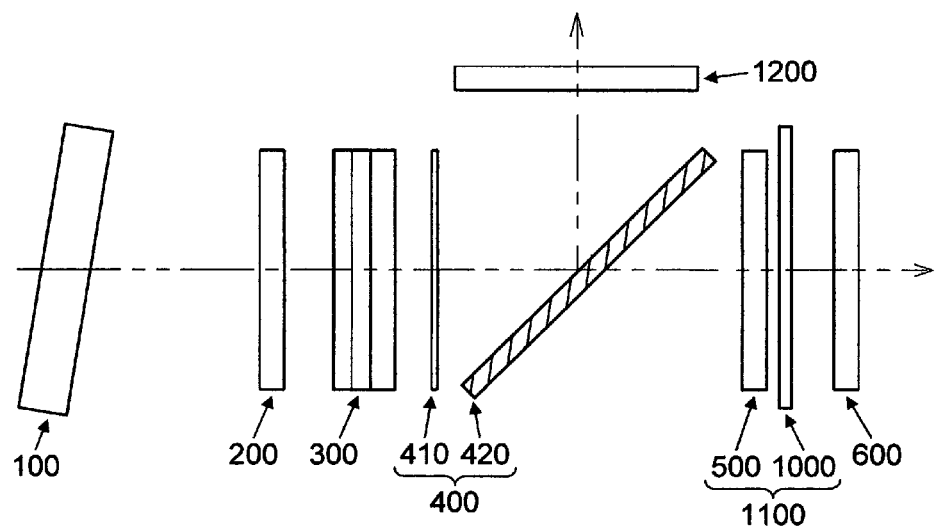
FIG. 4 shows an exemplary schematic of filter elements employing an angled polarizer and the option of a secondary viewing area, according to another preferred embodiment.

In another optional embodiment of the invention, one can create an additional secondary viewing area by making use of the fact that some polarizers separate and redirect each of the two planes of polarizations. One exemplary embodiment with two viewing areas is illustrated more clearly in FIG. 4. In this embodiment, pre-filter 100, AR filter 200, blocker/trimmer 300, heated etalon construct 1100, and exit AR filter 600 are used as in previous FIG. 3. The circular polarizer 400 is composed of λ/4 plate 410 and a reflective/transmissive-type linear polarizer 420. Thus, in the assembly of FIG. 4, the linear polarizing element 420 is used to transmit one polarization of light and reflect the other plane of polarization along a separate optical path toward a second viewing area. This is shown by a dotted line in FIG. 4. Exemplary types of reflective/transmissive polarizers for this application include, among others, polarizing beamsplitter cubes, wire-grid polarizers, and reflectance-type polarizers with some transmittance in the other plane. For optimized viewing along this separate secondary optical path, for example, with an auxiliary camera, additional filter element 1200 may be included. This additional element could be a neutral density filter or a filter with a selective bandpass region in the visible spectrum to match the viewing requirements. In addition, filter 1200 optionally may include linear polarizing properties to reduce stray signal from any incomplete removal of the other plane of polarization along this secondary optical path. For descriptive example, a 90° angle is shown for the reflected beam, but other angles are also within the scope of the invention.

Similarly, dual-viewing arrangements with secondary optical paths could be accomplished in the embodiments of FIG. 2, by replacing the beam-blocker 810 that absorbs transmitted light with either a viewing area or appropriate filters prior to a viewing area. If absorbing element 810 is removed, the transmitted polarization will propagate through the previously blocked surface to generate a secondary viewing area.

In the various embodiments of the invention, the discrete optical elements may be spaced apart from each other, and held in respective alignment by mounts, spacers or other positioning techniques. Alternately, some or all of the optical elements may be joined together by physical methods, including such techniques as optical adhesive bonding, lamination, or optical coupling media. Those skilled in the art will understand the relative advantages and concerns that a designer will weigh to determine which elements to separate or join, and by what techniques. For instance, separation can be used to isolate sensitive or delicate optical materials, while joining of elements can eliminate multiple surfaces and thus reduce reflective losses. These common design considerations are recognized within the scope of various embodiments of the invention.

Similarly, it will be understood by those of skill in the art that additional filters may be added to enhance or expand the described filtering functions. For instance, additional AR filters may be used either on the defined filter elements, or between the defined filter elements to reduce stray reflections throughout the optical assembly. In like manner, additional spectral bandpass filters may be incorporated to further refine sensitivity to the wavelength of interest, and/or to reduce interference from other light.

The invention will now be described in more specific detail with reference to the following non-limiting examples. These examples are intended as illustrations only since modifications and variations within the scope of the disclosure will be apparent to those skilled in the art.

EXAMPLE 1-3

The transmittance and bandwidth characteristics of each element, and of the combined optical assembly, were measured on a custom-built high-resolution spectrophotometer with a resolving power of 0.0023 nm. The spectrophotometer was calibrated for wavelength accuracy using both hydrogen and deuterium atomic emission line sources.

The optical assembly outlined in FIG. 1 was created with the optical elements described below, in their order of assembly from the light entrance path. In these examples, all elements were joined with an optical couplant.

A pre-filter with a measured transmittance of 94%, consisting of Schott RG610 glass coated on the entry surface with a broadband AR with a minimum in reflectance centered at 656.3 nm, and on the exit surface with a dichroic heat reflector with cutoff from 715 nm to beyond 1 micron.

A broadband AR (bandwidth of 430-680 nm, with a measured reflectance of 0.25% at 656 nm).

A blocker/trimmer filter consisting of a dielectric blocker with a FWHM of 1.3 nm centered at 656.1 nm on BK-7 glass, laminated with Fuller Epolite FH-5313 epoxy to a BK-7 substrate with an induced transmission metal filter (FWHM of 20 nm centered at 656.3 nm), and further laminated to RG610 glass. This laminated filter gives combined out-of-band blocking throughout the IR region, and the blue/UV/x-ray regions. The transmission of this blocker/trimmer filter combination was measured as 50%, with a FWHM of 1.3 nm.

A high performance, achromatic circular polarizer (Boulder Vision Optik, Boulder Colo.) with a measured transmittance of 88.2% in polarized light at 656 nm. Its measured contrast ratio (polarization extinction ratio) was 6250:1 at 656 nm.

For Examples 1-3, three different solid-state mica etalons were used. These particular etalons were prepared from ruby red mica, cleaved, and coated with dielectric multilayer coatings to achieve the bandpass indicated. The etalons differed from each other in their bandwidths and transmission properties, as shown in Table 1.

An exit AR filter with broadband reflectance (bandwidth of 430-680 nm, with a measured reflectance of 0.25% at 656 nm).

TABLE 1

| | Performance comparisons of Examples 1-3. | | | |
|---|---|---|---|---|
| Example | Etalon FWHM | Etalon % T | Overall % T for optical assembly | Comments |
| 1 | 0.12 nm | 20% | 8.2% | Just at the upper limit of acceptable % T for extended viewing |
| 2 | 0.06 nm | 16% | 6.6% | Acceptable for extended viewing |
| 3 | 0.04 nm | 13% | 5.4% | Acceptable for extended viewing; high resolution of fine detail |

EXAMPLES 4 AND 5

These are theoretical examples illustrating the use of a wire-grid polarizer. Using the configuration of elements outlined in FIG. 1, and the known filter elements described in Examples 2-3, but substituting a wire-grid polarizer and a standard (non-achromatic) λ/4 plate with a theoretical transmission value of 89% for the achromatic circular polarizer would be expected to give the following results shown in Table 2.

TABLE 2

| | Performance comparisons for illustrative theoretical Examples 4 and 5. | | | |
|---|---|---|---|---|
| Example | Etalon FWHM | Etalon % T | Overall % T for optical assembly | Comments |
| 4 | 0.06 nm | 16% | 6.7% | Acceptable for extended viewing |
| 5 | 0.04 nm | 13% | 5.4% | Acceptable for extended viewing |

EXAMPLES 6-10

These are theoretical examples illustrating the use of a polarizing beamsplitter, in the configuration of optical elements outlined in FIG. 2.

Using the following optical elements:
Pre-filter with Transmittance of 94%, as described in examples 1-3.
AR filters at the entrance and exit of the optical path, with reflectance of 0.25% at 656 nm, as in Examples 1-3.
Blocker/trimmer filter with transmittance of 50% and FWHM of 1.3 nm, as described in Examples 1-3, or alternately, a theoretical blocker/trimmer filter with a FWHM of 1.0 nm and theoretical transmission of 45%.
λ/4 plate with a 164 nm retardance value.
Polarizing beamsplitter cube with 94% theoretical reflection for the p-state.
Three absorbing, ruby red mica etalons, with different bandpass widths and transmittance values, as described in Examples 1-3, or alternately, theoretical lower transmittance etalons with the same bandwidth and transmittance values.

The expected performance with combinations of the two blocker/trimmer filters and the three different etalons in an optical assembly such as illustrated in FIG. 1 is summarized in Table 3.

TABLE 3

Performance comparisons for illustrative theoretical Examples 6-10.

| Example | Blocker/trimmer (FWHM/% T) | Etalon (FWHM/% T) | Overall % T | Comments |
|---|---|---|---|---|
| 6 | 1.0 nm/45% | 0.12 nm/20% | 7.9% | Just within upper limit of acceptable viewing % T |
| 7 | 1.5 nm/50% | 0.06 nm/16% | 7.0% | Acceptable viewing % T |
| 8 | 1.0 nm/45% | 0.06 nm/16% | 6.3% | Preferred viewing % T |
| 9 | 1.5 nm/50% | 0.04 nm/13% | 5.7% | Acceptable viewing % T |
| 10 | 1.0 nm/45% | 0.04 nm/13% | 5.1% | Acceptable viewing % T |

EXAMPLES 11-13

The following theoretical examples illustrate the use of the heated etalon construct outlined in FIG. 3. The optical elements for these Examples are as follows:
Pre-filter with Transmittance of 94%, as described in Examples 1-3.
AR filters at the entrance and exit of the optical path, and just before the heated etalon construct, each with reflectance of 0.25% at 656 nm, as described in Examples 1-3.
Blocker/trimmer filter with transmittance of 50% and FWHM of 1.3 nm, as described in Examples 1-3.
Achromatic circular polarizer with transmittance of 88.2%, as described in Examples 1-3.
Three theoretical absorbing mica or controlled lower transmittance etalons, with one side coupled to the thermally conductive optical element, and one side exposed to air. Coupling eliminates one air interface and therefore results in slightly higher transmission and slightly wider bandpasses for any given starting design.
Thermally conductive optical element of ITO coated glass, theoretical transmission of 94% due to ITO absorptive losses.

The expected performance with three etalons in an optical assembly such as illustrated in FIG. 3 is summarized in Table 4.

TABLE 4

Performance comparisons for illustrative theoretical Examples 11-13.

| Example | Etalon FWHM | Etalon % T | Overall % T | Comments |
|---|---|---|---|---|
| 11 | 0.132 nm | 22% | 9.1% | Too bright for normal human observer |
| 12 | 0.066 nm | 17.6% | 7.3% | Acceptable viewing % T |
| 13 | 0.044 nm | 14.3% | 5.9% | Acceptable viewing % T |

Accordingly, optical assemblies for solar telescopes are disclosed using low transmittance etalons in combination with high efficiency polarizers, pre-filters and blocker/trimmer filters to achieve the required transmission for safe and discriminating viewing of solar events. While preferred embodiments are disclosed herein, many variations are possible that remain within the concept and scope of the invention. One skilled in the art would recognize that the heated etalon construct could be substituted in the other embodiments with non-heated etalons, and vice versa. In the same manner, one of ordinary skill in the art would recognize that various linear polarizing elements could be used with a quarter-wave plate to create the required circular polarizer for this invention's use with the etalons. These and similar variations would become clear to one of ordinary skill in the art after inspection of the specification and the drawings herein. The inventions therefore are not to be restricted except within the spirit and scope of the appended claims.

The invention claimed is:

1. An optical filter assembly for telescopes with a primary optical path, the optical filter assembly comprising:
   a blocker/trimmer filter with transmittance of at least 40% and a FWHM bandwidth of less than 5 nm;
   only one circular polarizer, wherein the circular polarizer comprises a quarter-wave plate and a linear polarizing element, and wherein the linear polarizing element has a contrast ratio of at least 500:1 and an optical performance of at least 85% for its filtered plane of polarization along the primary optical path; and
   a solid-state etalon with less than 25% transmittance at the wavelength of interest, and FWHM bandwidth of less than 0.15 nm.

2. An optical filter assembly as defined in claim 1, wherein the solid-state etalon has a transmittance between 10 and 20% at the wavelength of interest.

3. An optical filter assembly as defined by claim 1, wherein the solid-state etalon has a FWHM between about 0.14 and 0.02 nm.

4. An optical filter assembly as defined by claim 1, wherein the solid-state etalon comprises absorbing mica.

5. An optical filter assembly as defined by claim 1, wherein the solid-state etalon comprises a high transmittance substrate with multiple layers of interference coatings.

6. An optical filter assembly as defined by claim 1, wherein the quarter-wave plate of the one circular polarizer comprises an achromatic quarter-wave plate.

7. An optical filter assembly as defined by claim 1, wherein the linear polarizing element of the one circular polarizer comprises an absorptive-type polarizer.

8. An optical filter assembly as defined by claim 7, wherein the absorptive-type linear polarizer comprises nanoparticles.

9. An optical filter assembly as defined by claim 1, wherein the linear polarizing element of the one circular polarizer comprises a reflective/transmissive-type linear polarizer.

10. An optical filter assembly as defined by claim 9, wherein the reflective/transmissive-type linear polarizer is a wire-grid polarizer or a polarizing beamsplitter.

11. An optical filter assembly as defined by claim 9, wherein the linear polarizing element further directs at least 85% of the other plane of polarization for viewing along a secondary optical path separate from the primary optical path.

12. An optical filter assembly as defined by claim 1, wherein the linear polarizing element of the one circular polarizer comprises a reflective-type linear polarizer.

13. An optical filter assembly as defined by claim 1, wherein the blocker/trimmer has a FWHM bandwidth of less than 2 nm.

14. An optical filter assembly as defined by claim 1, wherein the blocker/trimmer comprises an induced transmission metal/dielectric filter.

15. An optical filter assembly as defined by claim 1, further comprising a pre-filter positioned before the blocker/trimmer in the optical filter assembly.

16. An optical filter assembly as defined by claim 1, further comprising an AR filter.

17. An optical filter assembly as defined by claim 1, further comprising a thermally conductive, electrically powered optical element that is physically coupled to the solid-state etalon, wherein the thermally conductive element is controllably powered to maintain the coupled solid-state etalon at a selected temperature.

18. An optical filter assembly as defined by claim 17, wherein the thermally conductive optical element is ITO-coated glass.

19. An optical filter assembly as defined by claim 1, wherein the telescope is a solar viewing telescope.

20. An optical filter assembly as defined by claim 1, wherein the wavelength of interest is the Hα emission near 656 nm.

* * * * *